(12) United States Patent
Raynes et al.

(10) Patent No.: US 7,346,570 B2
(45) Date of Patent: Mar. 18, 2008

(54) STRUCTURED FINANCE PERFORMANCE MONITORING INDEX

(75) Inventors: Sylvain Raynes, Jackson Heights, NY (US); Ann Elaine Rutledge, Jackson Heights, NY (US)

(73) Assignee: R&R Consulting Limited, Wanchai (HK)

( * ) Notice: Subject to any disclaimer, the term of this patent is extended or adjusted under 35 U.S.C. 154(b) by 1205 days.

(21) Appl. No.: 10/332,970

(22) PCT Filed: Jul. 16, 2001

(86) PCT No.: PCT/US01/22259

§ 371 (c)(1),
(2), (4) Date: Jan. 14, 2003

(87) PCT Pub. No.: WO02/07049

PCT Pub. Date: Jan. 24, 2002

(65) Prior Publication Data

US 2003/0208431 A1 Nov. 6, 2003

Related U.S. Application Data

(60) Provisional application No. 60/218,486, filed on Jul. 14, 2000.

(51) Int. Cl.
*G06Q 40/00* (2006.01)

(52) U.S. Cl. .................. 705/36 R; 705/35; 705/40
(58) Field of Classification Search .......... 705/35, 705/36, 40
See application file for complete search history.

(56) References Cited

U.S. PATENT DOCUMENTS

| 5,946,667 | A | | 8/1999 | Tull, Jr. et al. ............ 705/36 |
| 6,061,662 | A | * | 5/2000 | Makivic ................. 705/36 R |
| 7,010,510 | B1 | * | 3/2006 | Schellhorn ............. 705/36 R |
| 2002/0035530 | A1 | * | 3/2002 | Ervolini et al. ............ 705/36 |

* cited by examiner

*Primary Examiner*—James P. Trammell
*Assistant Examiner*—Samica L Norman
(74) *Attorney, Agent, or Firm*—Weingarten, Schurgin, Gagnebin & Lebovici LLP

(57) ABSTRACT

A method for assessing and dynamically rating transactions (180) for structured finance transactions. The method assesses the deviation (170) from a payment promise to be expected from securities backed by pools of assets of various forms (100), the securities being issued in a plurality of tranches (125). The liabilities of the transaction, including triggers and external form of credit enhancement, are taken into account precisely to compute the deviation from the payment promise to be expected by liability holders. Data representing the structure of the transaction and the current state of the asset pool are received (100). A Markov chain formalism (150) is applied on the received data, and a cash flow model is constructed to predict the cash flow performance (180) of the asset pool.

21 Claims, 7 Drawing Sheets

New Status

|  | Current | 30 days | 60 days | 90 days | Default | Prepay |
|---|---|---|---|---|---|---|
| Current | C00 | C01 | C02 | C03 | C04 | C05 |
| 30 days | C10 | C11 | C12 | C13 | C14 | C15 |
| 60 days | C20 | C21 | C22 | C23 | C24 | C25 |
| 90 days | C30 | C31 | C32 | C33 | C34 | C35 |
| Default | C40 | C41 | C42 | C43 | C44 | C45 |
| Prepay | C50 | C51 | C52 | C53 | C54 | C55 |

Old Status (row labels)

*FIG. 2*

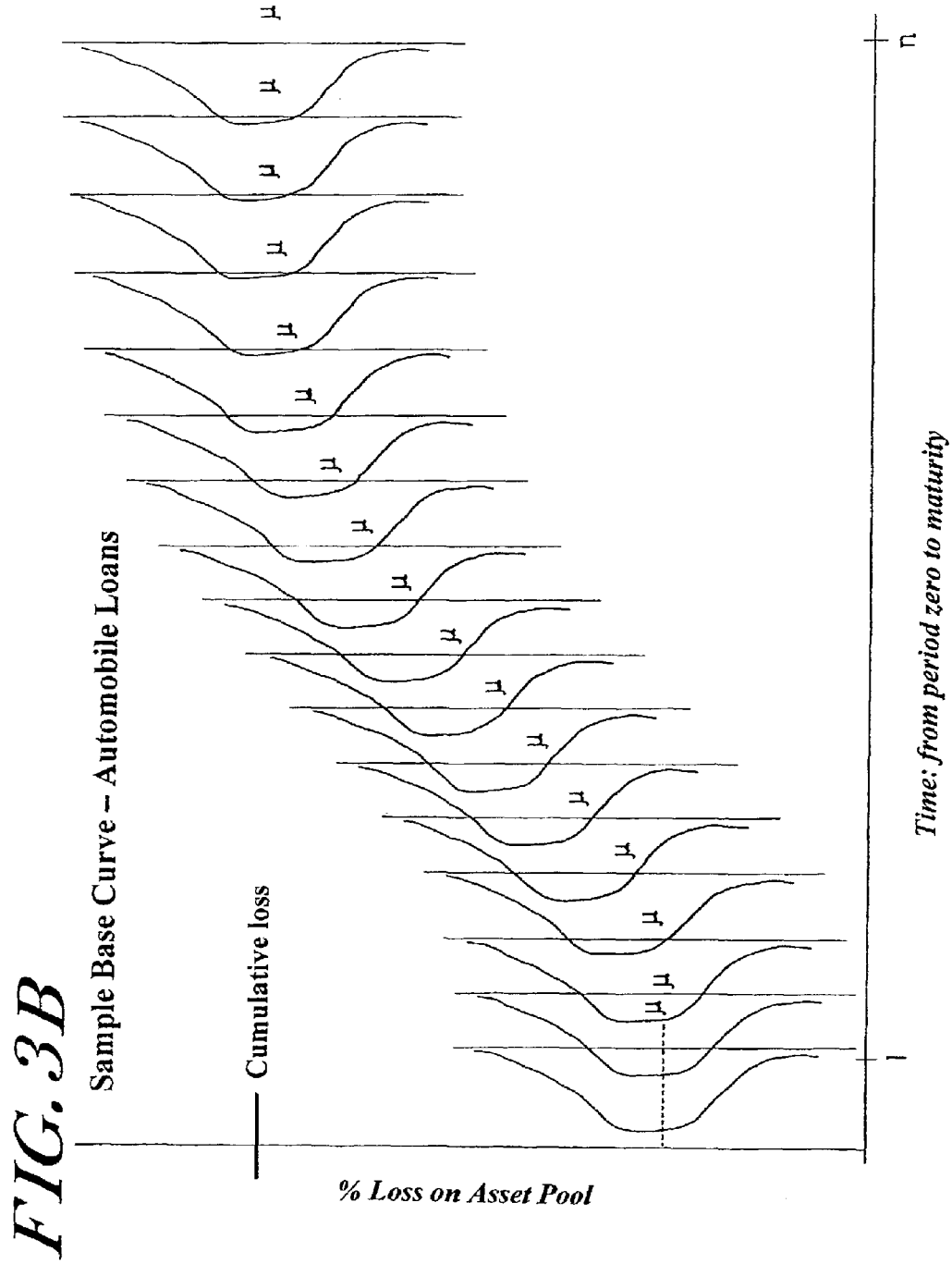

STRUCTURED FINANCE PERFORMANCE MONITORING INDEX

CROSS REFERENCE TO RELATED APPLICATIONS

This application claims priority under 35 U.S.C. §119(e) to provisional patent application Ser. No. 60/218,486 filed Jul. 14, 2000, the disclosure of which is hereby incorporated by reference.

STATEMENT REGARDING FEDERALLY SPONSORED RESEARCH OR DEVELOPMENT

N/A

BACKGROUND OF THE INVENTION

Structured finance is a financing technique whereby specific assets are placed in a trust, thereby isolating them from the bankruptcy risk of the entity that originated them. Structured finance is known to be a market in which all parties rely to a great extent on the ratings and rating announcements to understand the credit risks and sources of protection in structured securities (of which there are many types, asset-backed commercial paper (ABCP), asset-backed securities (ABS), mortgage-backed securities (MBS), collateralized bond obligation (CBO), collateralized loan obligation (CLO), collateralized debt obligation (CDO), structured investment vehicles (SIV), and derivatives products company (DPC), synthetic CLOS, CBOs of ABS, collectively "structured finance.") Currently, the credit quality of securities issued in connection with structured financings are determined at closing by comparing the amount of enhancement in a given transaction relative to the estimated portfolio variability of losses over the effective life of the transaction. However, these ratings are rarely, if ever, updated to reflect actual experience. Accordingly, a method is desired for dynamically updating the credit rating of structured securities based on actual credit loss and other performance.

Structured financings are typically the result of the sale of receivables to a special purpose vehicle created solely for this purpose. Securities backed by the receivables in the pool ("asset pool") are then issued. These are normally separated into one or more "tranches" or "classes", each with its own characteristics and payment priorities. Having different payment priorities, the tranches accordingly have different risk profiles and payment expectations as a function of the potential delinquencies and defaults of the various receivables and other assets in the pool. The senior tranche usually has the lowest risk.

BRIEF SUMMARY OF THE INVENTION

The present invention is directed to a method for calculating and dynamically updating the credit quality of securities issued in connection with structured financings. Said credit quality is measured as a deviation from the relevant payment promise with respect to said securities. Such a deviation can occur when, for a variety or reasons, the assets do not generate sufficient cash flows to reimburse the investors in full, interest and principal.

In this method, data representing the structure of the transaction and data representing the current state of the asset pool are used. A Markov chain formalism is used with respect to the received data to predict the cash flows likely to be received from the asset pool. Cash flows generated by the Markov chain model are applied to the liabilities according to the exact payment priority set out in the transaction documents. This priority may include features such as triggers, insurance policies and external forms of credit enhancement. Accordingly, this method models performance of the structured security based on the cash-generating capacity of individual exposures.

Other aspects, features and advantages of the present invention are disclosed in the detailed description that follows.

BRIEF DESCRIPTION OF THE SEVERAL VIEWS OF THE DRAWING

The invention will be more fully understood by reference to the following detailed description of the invention in conjunction with the drawings, of which:

FIG. 2 illustrates a Markov state transition matrix for a structured financing transaction according to an embodiment of the present invention;

FIG. 3(B) illustrates a credit loss base curve for an automobile loan securitization, or the expected case in a rated transaction with multiple curves showing the local variability of credit losses;

DETAILED DESCRIPTION OF THE INVENTION

Figure 1:
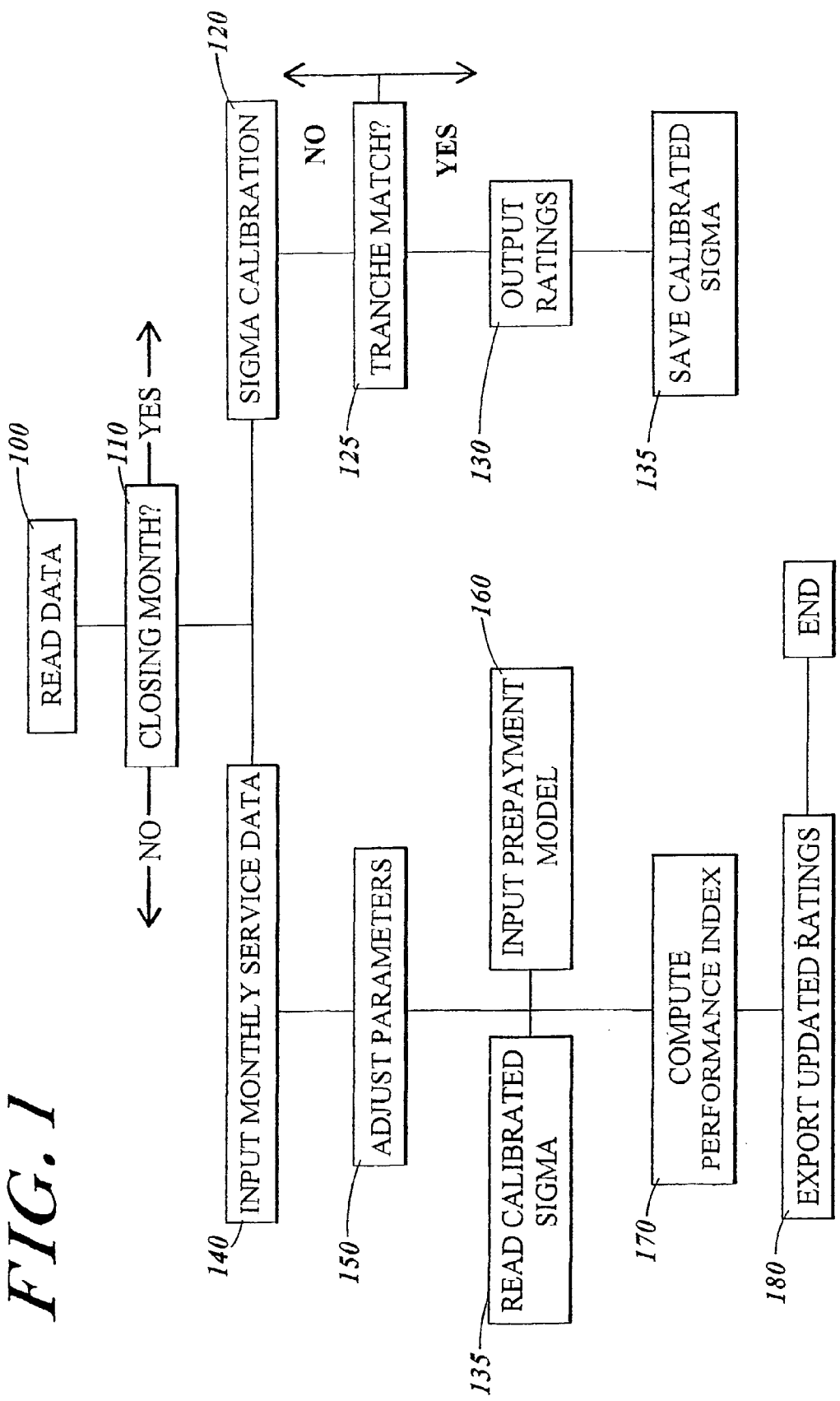
FIG. 1 is a flow chart for the structured finance performance index calculation method according to an embodiment of the present invention.

A flow chart is illustrated in FIG. 1 for a method of calculating the deviation from a payment promise associated with a structured financing that may be characterized by an asset pool and one or more liability tranches according to an embodiment of the present invention.

In the present calculation method, two distinct processes are performed. The first process is performed either at closing or during the closing time period of a transaction. The second process is performed every subsequent time period until the lower of the average maturity of the asset pool or the point at which the securities have matured or been retired. The time period is measured in accordance with market customs and is typically one month. A more detailed description of the processes for the method in the present embodiment follows with reference to FIG. 1.

The present method begins by reading various data and variables associated with the transaction at step 100. These data will be used to compute the performance-monitoring index. The data and variables read at step 100 include data such as basic transaction parameters (interest rates, etc.), liability structure information, initial asset pool information such as the number of accounts and average quantities, initial tranche ratings as assigned by rating agencies, and specific Markov-process based parameters and deal information on which the performance monitoring index is based. The data are read in from various sources and data providers.

FIG. 2 illustrates an example of a Markov matrix having the new status corresponding to columns 0, 1, 2, 3, 4 and 5 of the matrix, and the old status corresponding to rows 0, 1, 2, 3, 4 and 5 of the matrix. The value of cell $c_{00}$ of this matrix corresponds to the probability of an account remaining in state 0 at the end of a time period given that it was in state 0 at the beginning of the period. Beyond cell $c_{00}$, and moving to the right, each cell value represents the probability of a periodic transition from state 0 to a further delinquency condition, worsening as we move right across columns. In other words, the value in each cell corresponds to the probability that an account will move to a delinquency status indicated by the column heading given a starting position measured by the row number. In any row of the Markov matrix, the sum of the probabilities must equal one by definition. Typically, the last two cells in a row correspond to default and prepayment transition probabilities, respectively. Also, a non-zero probability cannot practically exist in more than one cell to the right of the diagonal from cell $c_{00}$, $c_{11}$, . . . due to timing conventions (i.e. it is physically impossible for an account in any delinquency status to become delinquent by more than one additional time period in the span of a single time period).

To determine the status-wise probability distribution of the accounts in the asset pool for the first period after closing of the transaction, a row matrix $V_{it}$ is used. This matrix represents the initial probability distribution of the accounts in the transaction. The Markov matrix (P) is pre-multiplied by the row matrix (i.e. $V_{it}*P$) to compute the new status-wise probability distribution of accounts after the first time period. Generally, the probability distribution of the accounts for any period, n, in the future is given by the equation $V_{it}*P^n$. Further, the cash flows associated with a given time period are derived from the change in the probability distribution of accounts between two consecutive time periods using the credit policies in force for the assets underlying the transaction. These policies are available from one or more parties to the transaction.

The entries of the Markov matrix at each time step are computed with reference to a credit loss base curve characteristic of the relevant asset class derived from issuer data. The parameters of the known base curve, in conjunction with random deviates issuing from specified probability distributions with parameters defined by the base curve, are used to modulate one or more entries of the Markov matrix at each time period to reflect expected cash flow dynamics.

Referring again to FIG. 1, a determination is made at step 110 as to whether we are at either the closing or during the closing month for the transaction. If the current period is the closing period, a "sigma" calibration is performed at step 120 for the transaction. The purpose of this calibration is the determination of the volatility of asset performance necessary to cause the senior tranche of the transaction to display the deviation from its payment promise corresponding to the credit rating assigned to it by the rating agencies that have rated the transaction. This calibration is accomplished via a Monte Carlo simulation that utilizes the Markov chain formalism and is performed using the exact liability structure of the transaction. After each Monte Carlo run, the above volatility is modified in such a manner as to take the senior tranche payment promise deviation closer to that implied by its credit rating. This process is continued until convergence. The result of the calibration is the standard deviation of asset performance implied by the senior tranche credit rating assigned to the transaction by the rating agencies. A by-product of these calculations is the peformance monitoring index for the other tranches of the transaction computed in the same manner, i.e. as a deviation from their payment promise.

Once the calibration has converged at step 125, initial performance monitoring index values for each tranche are output at step 130. By construction, the senior tranche rating is identical to the agency's rating. In general, the lower rated tranche classes will have different ratings from the rating agencies as the present method uses an objective and unique numerical scale for each letter-grade rating category (Aaa, Aa, Baa, etc.). As a result, the performance monitoring index values generated by the present method for all lower tranches will not necessarily agree with the corresponding letter-grade credit rating assigned to them by the rating agencies. The calibrated sigma is then stored at step 135 for later use in updating the performance monitoring index value for each tranche at each time period.

Data for any later period are input at step 140 from commercially available databases that aggregate transaction information based on trustee and servicer reports. This occurs during the second and each subsequent period.

Current deal performance is compared to expected performance at closing and differences are used to adjust Markov chain parameters at step 150. These updated Markov matrices are then handled via the same process of multiplying them in succession with a row matrix $V_{it}$ from period two to maturity. Specifically, the defining parameters of the credit loss base curve are modified with reference to the difference between expected and actual performance. This updated base curve is then used within the Markov chain formalism described earlier to re-compute the performance-monitoring index in the same manner. Variables such as delinquencies, defaults and pre-payments may be used in the adjustments. A number of ad-hoc adjustment processes may be substituted for the ones normally employed based on the needs of particular investors or issuers. For instance, more emphasis may be placed on defaults (e.g. with automobile loan assets) or on pre-payments (e.g. with mortgage assets).

The performance-monitoring index is then computed at step 170 for the relevant time period. Prepayment assumptions based on commercially available codes and approximations may be input at step 160 for integration into the computation performed at step 170. The Markov chain formalism is capable of interfacing with most conventional pre-payment models.

The prepayment probability is normally the second to last entry in the first row of the Markov matrix. It is referred to as the single month mortality ("SMM") by prepayment modelers. Under the present invention, the SMM definition excludes pre-payments that originate from obligors in delinquent states. Commercially available SMM values are typically given on a dollar rather than an account basis, but the difference between the dollar and account values is generally small compared to the accuracy of most commercially available prepayment models. These models may be integrated with the Markov chain formalism described herein by inserting SMM values in the appropriate cell of the matrix.

In computing the performance monitoring index value at step 170, the data from the pre-payment models input at step 160 and the standard deviation computed at step 135 are utilized.

The performance-monitoring index is output at step 180 so that users may receive and display the generated information.

Figure 3A:
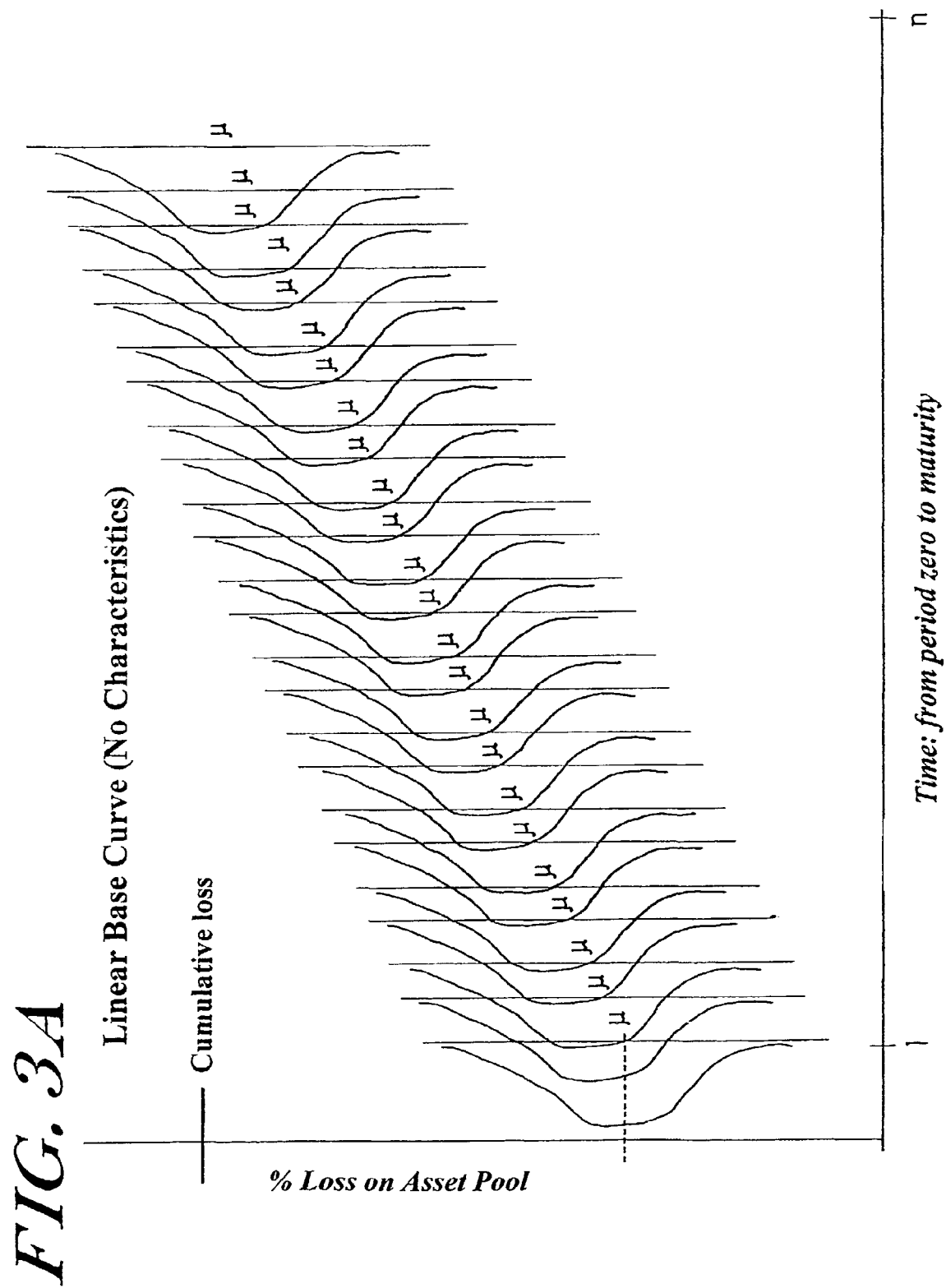
FIG. 3(A) illustrates an example of a credit loss base curve for an asset of unknown character and seasoning pattern with multiple curves showing the local variability of credit losses.
Figure 3C:
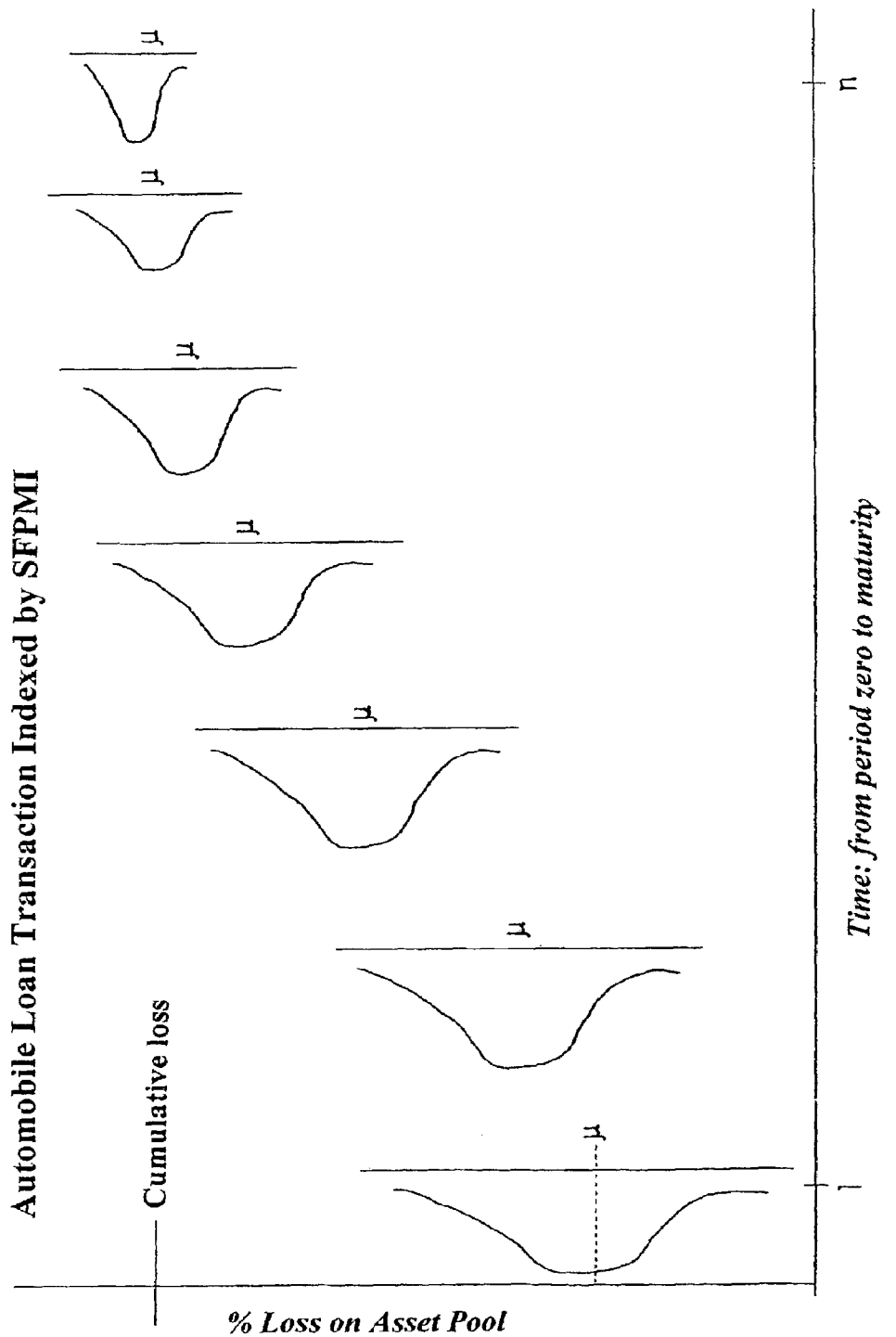
FIG. 3(C) illustrates a dynamic credit loss base curve for a performing auto loan securitization according to an embodiment of the present invention with multiple curves showing the local variability of credit losses.

A general idea of the concepts underlying the performance-monitoring index described herein may be obtained by reference to FIGS. 3(A)-3(D). In FIG. 3(A), a credit loss base curve is shown for an asset of unknown character and seasoning pattern, and with multiple curves meant to convey the local variability of credit losses. In FIG. 3(B), another credit loss base curve is shown for an automobile loan securitization, or the expected case in a rated transaction, and with multiple curves meant to convey the local variability of credit losses. The implied rating agency credit loss base curve analysis presented in FIG. 3(B) is contrasted with results obtained in each corresponding period at step 170 of the method for the present embodiment of the invention as shown in FIG. 3(C). The conventional analysis connected with FIG. 3(B) is not adjusted for incremental information available on the transaction, whereas the expectation as illustrated in FIG. 3(C) is adjusted by the method described according to the present embodiment.

Figure 3D:
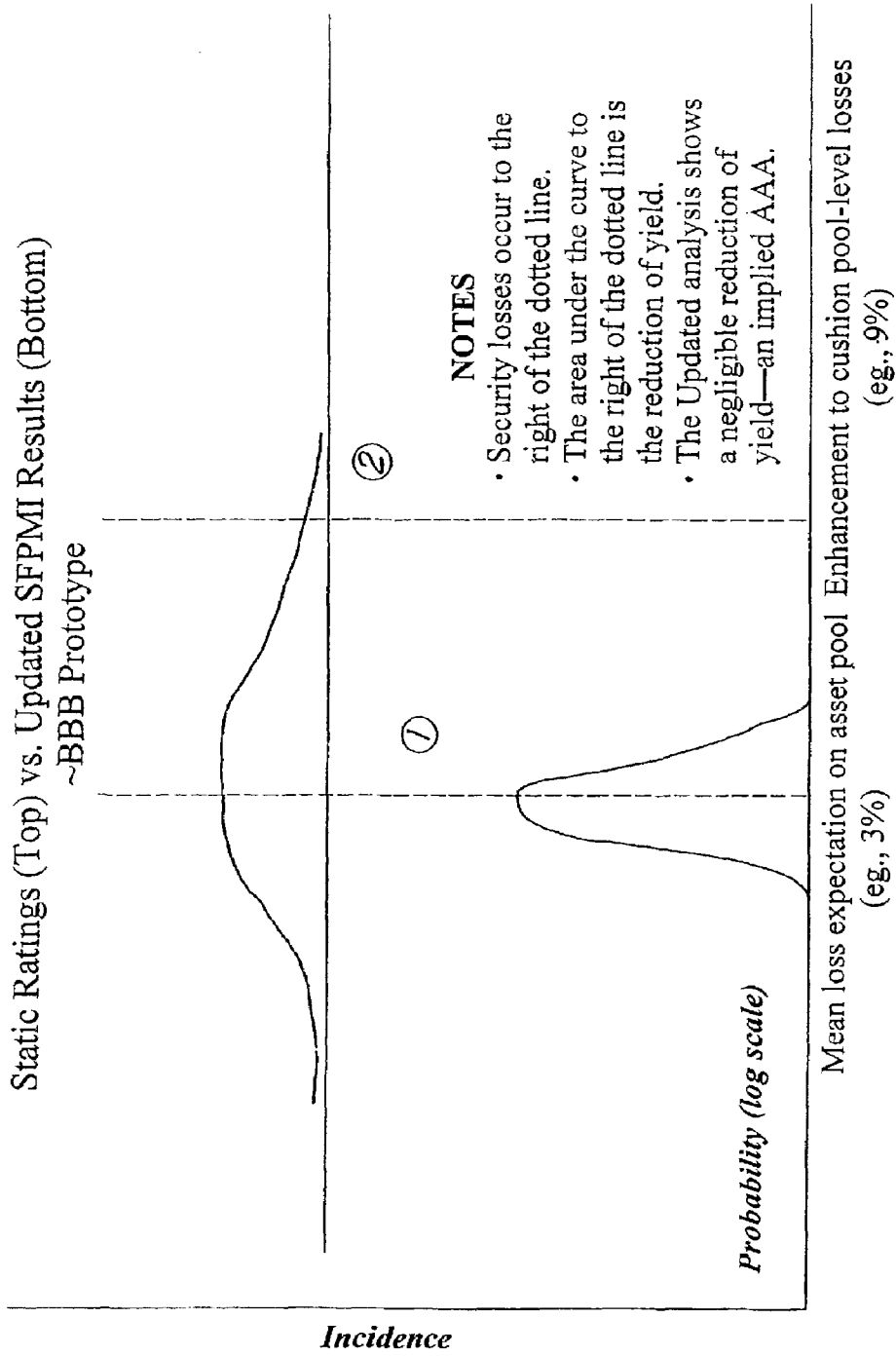
FIG. 3(D) illustrates the deviation from the payment promise for transactions with improving performance according to an embodiment of the present invention.

Contrast, further, the analysis shown in FIGS. 3(B) and 3(C) with the analysis shown in FIG. 3(A), where seasoning effects are not considered. In the case of performing pools, the method according to the present embodiment reflects the fact that the credit loss volatility of these pools will decrease as time passes, causing a corresponding improvement in the average credit quality of the securities backed by it. In other words, as loss volatility decreases with the passage of time, the expected deviation from the payment promise narrows, as shown in FIG. 3(D). In particular, the top curve in FIG. 3(D) illustrates exemplary loss volatility at the time of closing and the bottom curve of FIG. 3(D) illustrates exemplary loss at some time after closing. In the top curve, the area under it and to the right of line 2 (the enhancement to cushion pool level losses) represents pool credit loss values that will cause losses on the securities backed by it. These latter losses can be measured in yield reduction from the payment promises. The updated analysis shown by the bottom curve, and taken some time after closing, shows a negligible reduction of yield, having negligible area to the right of line 2.

According to the embodiments of the present invention, a performance-monitoring index is provided for periodically assessing the deviation from a payment promise associated with a structured financing, using updated asset pool performance data as it becomes available so that the performance monitoring index may be dynamically updated during the life of the transaction. The performance-monitoring index uses a Markov chain formalism to predict and adjust the prediction of future cash flows generated by the asset pool to service the securities and adjusts the loss estimate based on current information from the subject asset pool as it becomes available. The performance-monitoring index models the precise liability structure of the transaction in a cash flow framework. Thereby, the performance-monitoring index is able to determine the deviation from a payment promise, normally measured as a loss in basis point yield, on each of a plurality of tranches based on their contractual payment characteristics.

Figure 4:
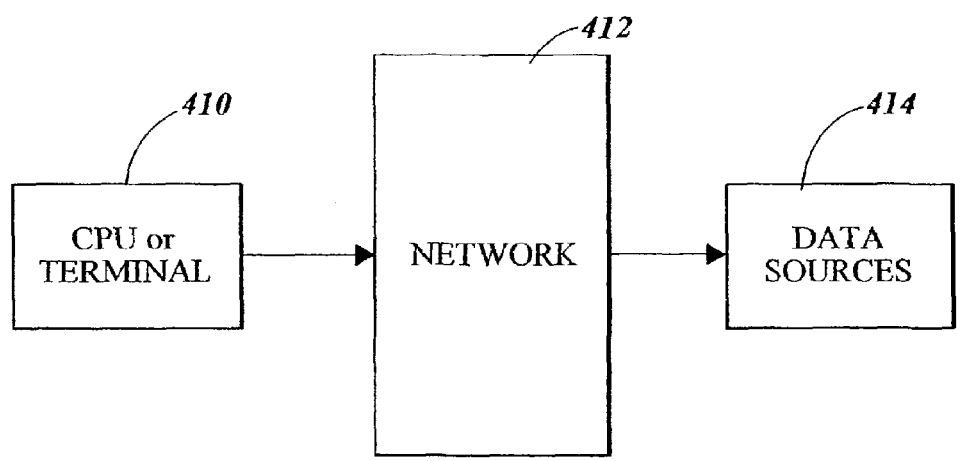
FIG. 4 illustrates a computer system for performing the method according to embodiments of the present invention.

The invention is typically performed in a powerful computer environment given the number of times the basic matrix calculations are performed. As such, one or more CPUs or terminals 410 are provided as an I/o device for a network 412 including distributed CPUs, sources and internet connections appropriate to receive the data from sources 414 used in these calculations as illustrated in FIG. 4 in an embodiment of the present invention.

It will be apparent to those skilled in the art that other modifications to and variations of the above-described techniques are possible without departing from the inventive concepts disclosed herein. Accordingly, the invention should be viewed as limited solely by the scope and spirit of the appended claims.

What is claimed is:

1. A method for assessing a deviation from a payment promise associated with a pool of assets in the form of receivables associated with a structured finance transaction that may characterized by a plurality of tranches, each with its own contractual payment characteristics, the method comprising: receiving data representing the structure of the transaction; receiving data representing a current state of an asset pool; applying Markov chain formalism on the received data to predict asset pool performance; constructing a cash flow model that uses a precise liability structure of the transaction; calibrating results of the cash flow model for an initial time period such that a rating of the senior tranche of the transaction matches a rating assigned to the same tranche by rating agencies; and modulating one or more entries of a Markov probability transition matrix using current deal performance to update an expected deviation from the payment promise on each tranche.

2. The method of claim 1 wherein said steps of receiving current data and of using Markov chain formalism are performed once a payment period.

3. The method of claim 2 wherein said period is defined by market custom.

4. The method of claim 2 wherein said step of receiving current state data includes receiving asset delinquency data.

5. The method of claim 4 wherein said step of using Markov chain formalism is essentially accomplished in matrix form as follows:

$$Pd = Vit * Pn$$

where, Pd is an account-wise delinquency probability distribution at time n, n is a number of time periods from a current period; Vit is a row matrix giving an initial probability distribution of accounts in the transaction in predetermined categories corresponding to one or more Markov states; and P is a Markov matrix of rows and columns, cell entries of which being equal to account status transition probabilities for each period.

6. The method of claim 5 wherein "n" represents an initial period and has the value 1.

7. The method of claim 5 wherein a sum of cell entries in any row of the Markov matrix equals one.

8. The method of claim 5 further including the steps of: receiving pool data representative of general delinquency patterns, regular principal, interest, defaults and prepayments from an originator of receivables for the current period; modulating one or more cell entries of said matrix according to received delinquency, default and prepayment data.

9. The method of claim 8 wherein said modulation is based on specified probability distribution functions.

10. The method of claim 8 wherein said asset pool, having been acquired by a special purpose entity, provides said delinquency, regular principal, interest, prepayment and default data once a period.

11. The method of claim 8 wherein said modulation includes the step of changing the matrix' one or more cell entries in response to received delinquency data so as to reflect current dynamics of pooled assets.

12. The method of claim 8 wherein said modulation includes the step of changing the matrix' one or more cell entries in response to received default, regular principal, interest and prepayment cash flow data so as to reflect current dynamics of pooled assets.

13. The method of claim 9 further including the step of initially calibrating said matrix using an implied volatility of said asset pool.

14. The method of claim 13 wherein said calibration step includes the step of determining the volatility of said asset pool.

15. The method of claim 14 wherein said volatility corresponds to a standard deviation of said distribution of credit losses for said asset pool.

16. The method of claim 14 wherein said transaction has a senior tranche with a credit rating and said volatility determining step includes the step of determining a volatility that provides a deviation from the payment promise consistent with said credit rating.

17. The method of claim 16 wherein said volatility determining step includes the step of performing a Monte Carlo simulation to determine said volatility consistent with said credit rating.

18. The method of claim 17 wherein said transaction is further characterized by a waterfall, triggers and other structural features, and said simulation includes accounting for said waterfall, triggers and other structural features.

19. The method of claim 17 wherein said simulation includes a convergence process.

20. The method of claim 1 wherein said Markov chain formalism step is repeated for each time period, enabling a performance index to be assigned to said plurality of tranches at each time period.

21. The method of claim 2 wherein said step of receiving current state data includes receiving default, regular principal, interest and prepayment cash flow data.

* * * * *

UNITED STATES PATENT AND TRADEMARK OFFICE
CERTIFICATE OF CORRECTION

PATENT NO.       : 7,346,570 B2
APPLICATION NO.  : 10/332970
DATED            : March 18, 2008
INVENTOR(S)      : Sylvain Raynes et al.

Page 1 of 1

It is certified that error appears in the above-identified patent and that said Letters Patent is hereby corrected as shown below:

Column 5, line 64, "I/o" should read --I/O--; and

Column 7, claim 13, line 6, "9" should read --8--.

Signed and Sealed this

Sixteenth Day of June, 2009

JOHN DOLL
*Acting Director of the United States Patent and Trademark Office*